United States Patent [19]
Kohlman

[11] Patent Number: 5,518,635
[45] Date of Patent: May 21, 1996

[54] POOL SAVER

[75] Inventor: Herman F. Kohlman, 624 N. Quillan, Kennewick, Wash. 99336

[73] Assignee: Herman F. Kohlman, Kennewick, Wash.

[21] Appl. No.: 322,460

[22] Filed: Nov. 21, 1994

[51] Int. Cl.$^6$ .................................................. C02F 1/76
[52] U.S. Cl. ........................ 210/749; 210/754; 210/469; 210/416.2
[58] Field of Search ........................... 210/96.1, 101, 210/138, 169, 199, 416.2, 743, 749, 752, 754, 756

[56] References Cited

U.S. PATENT DOCUMENTS

| | | | |
|---|---|---|---|
| 3,763,878 | 10/1973 | Harden | 210/169 |
| 4,016,079 | 4/1977 | Severin | 210/169 |
| 4,056,470 | 11/1977 | Carpenter | 210/169 |
| 4,224,154 | 9/1980 | Steininger | 210/169 |
| 4,657,670 | 4/1987 | Newton | 210/169 |
| 4,767,511 | 8/1988 | Aragon | 210/169 |
| 5,100,542 | 3/1992 | Landman et al. | 210/169 |

Primary Examiner—Peter A. Hruskoci
Assistant Examiner—Theodore M. Green

[57] ABSTRACT

A simple winterizing/maintenance process which enables the pool owner to take samples of a swimming pool water, analyze it, and add the appropriate chemicals to the pool during the wintertime off-season months when it is covered and out of normal service. A device has been designed to distribute chemicals throughout a pool and provide the necessary mixing action to assure homogeneity of the water and chemicals. This entire process is performed with the pool cover in place and the main pool pump and filtration system out of operation. The need to winterize the pool or lift the cover at any time during the off-season is eliminated.

2 Claims, 2 Drawing Sheets

5,518,635

POOL SAVER

BACKGROUND OF THE INVENTION

1. Field of the Invention

This invention relates, in general, to winter time swimming pool maintenance capability. In particular, to a means of maintaining the chemical balance of the pool during off-season months for the prevention of bacteria and algae growth.

2. Description of the Related Art

As pool owners too often discover after a winter time of non use of their pool, a dilemma is waiting for them upon opening. The problem is bacteria and algae growth during the unused months when the pool is covered with a heavy plastic tarp or custom pool cover.

The normal means to prevent the growth is a process called pool winterization. This is where the pool's water level is lowered and the water is saturated with chemicals in the hope of being chemically maintained throughout the winter months. The super chlorination and shock treatments, as well as the addition of acids and/or alkaloids, are introduced to the pool in vast amounts. The pool is then covered and left in this state for up to 9 months at a time.

The problem with this process 9 times out of 10 is the pool has become contaminated and overtaken with algae and bacteria growth. The pool walls, if made of a cement product, become stained with black, rust or green colored markings left from the algae. The cost to have the pool cleaned and restored to an acceptable level is enormous. The pool is usually never as clean as the prior year, always being degraded by the passing winter season. Even adding chemicals during the season hasn't solved the problem,l as localized concentrations of the chemicals would only treat a limited area of the pool without the main pump circulating the water. The headache of trying to lift the cover does not warrant the effort involved. Adding chemicals and turning on the system pump cannot be accomplished since the pool was lowered below the pump's intake lines to prevent the pipes from freezing, a more serious situation than the algae growth itself.

The main problem with the winterization process is that the chemicals during the warmer months tend to be consumed at a much greater rate than during the colder months, leaving the pool untreated for sometimes months at a time.

SUMMARY OF THE INVENTION

In light of the prior art, it is a major objective of the present invention to provide a simple process and tool which implements the solution to the problem. It is another objective of the invention to allow the pool to be thoroughly mixed with chemicals and evenly dispersed all with the cover in place, and without the need of the existing pool pump system.

In order to accomplish the above and still further objectives, the system provides the means to analyze the water and the ability to introduce, mix, inject and evenly disperse chemicals into a covered swimming pool.

Prior to covering up the pool and adding the usual unnecessary winterizing chemicals, the system is set into place in the pool with its water level lowered for winterizing purposes. A header manifold connected to a submersible pump is placed into the water with the pool chemical container located near the edge of the cover. A rigid sectioned pipe is attached to the manifold, and a tygon tube to the manifold venturi. The other end of the pipe and tubing is connected to the pool chemical container. The cover is then placed over the system. With the pump on, a grab sample of the pool water can be taken at any time. The pool sample is manually checked with a common pool analyzing kit, as is normally done during the pool's open season. If the water needs chemicals, these are added to the pool chemical container and injected into the recirculation stream of the pump. The chemicals are then transported throughout the pool via the distribution manifold. The submersible pump is wired into a timer which allows ample mixing time of the chemicals.

DETAILED DESCRIPTION

Figure 1:
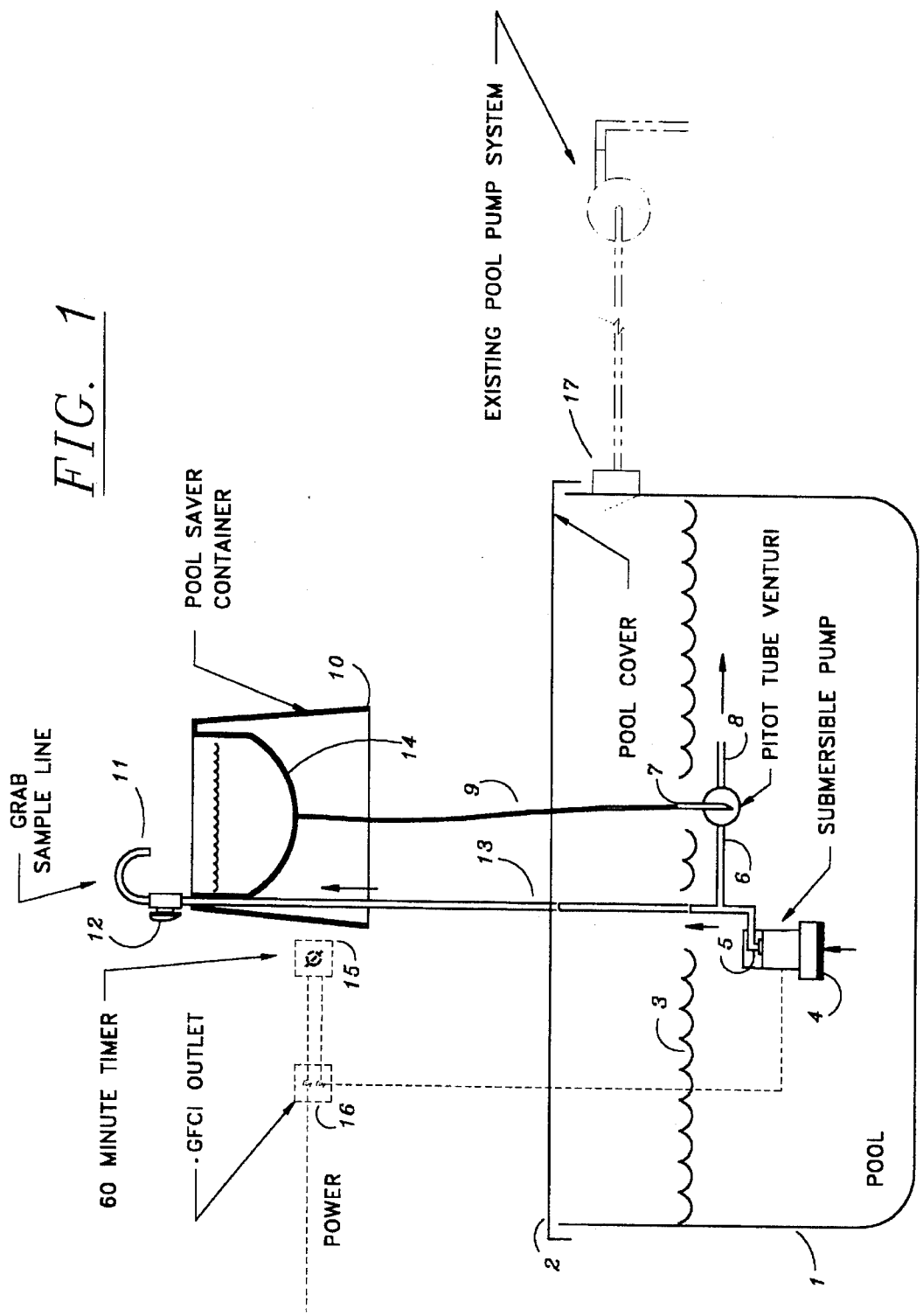
FIG. 1 is a schematic of the pool recirculation system and chemical pool container and injector.
Figure 3:
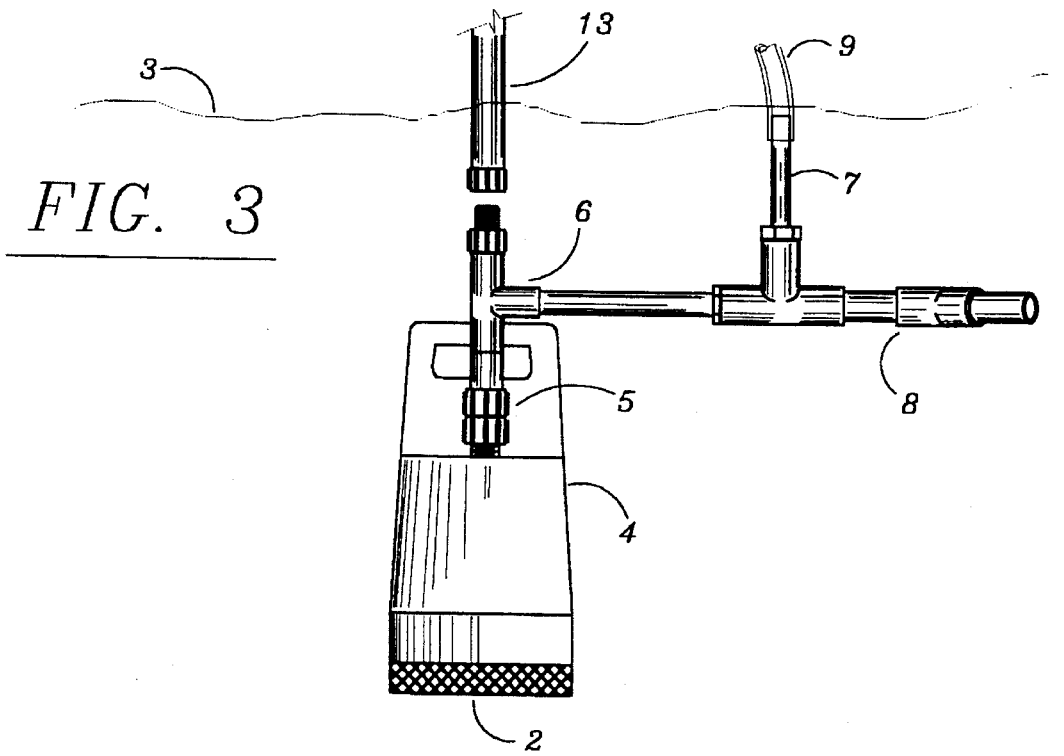
FIG. 3 is an elevation view of the submersible pump and the manifold, venturi, and associated connection pipes as shown in FIG. 1.

Referring to FIG. 1, shown is a swimming pool 1 with a cover 2 in place. The pool water level 3 is lowered below the existing pool pump system's 17 intake line(s). Prior to the cover 2 being placed over the pool 1, the submersible pump 4 is placed into the pool water. Now referring to FIG. 3 for better detail, the pump 4 is lowered to a depth below the pool's water line 3. The manifold 6 & 8 is installed on the pump's discharge fitting 5. Connections to the manifold, are the rigid grab sample line 13 and the chemical supply line 9 attached to manifold venturi 7.

Now referring back to FIG. 1, the system operation begins with the submersible pump 4, plugged into the GFCI protected receptacle 16. The pump is activated by turning the container mounted timer 15 on. Referring back to FIG. 3, the pool water 3 is drawn through the pump 4 and out the discharge 5. At this point, the water has two routes to take, out the manifold 6 & 8 or up through the grab sample line 13. Now referring back to FIG. 1, under a grab sample condition, the water flows only up the sample line 13 when the ball valve 12 is opened. The water sample is taken at the spigot 11 and analyzed with a simple pool chemical analysis kit.

Figure 2:
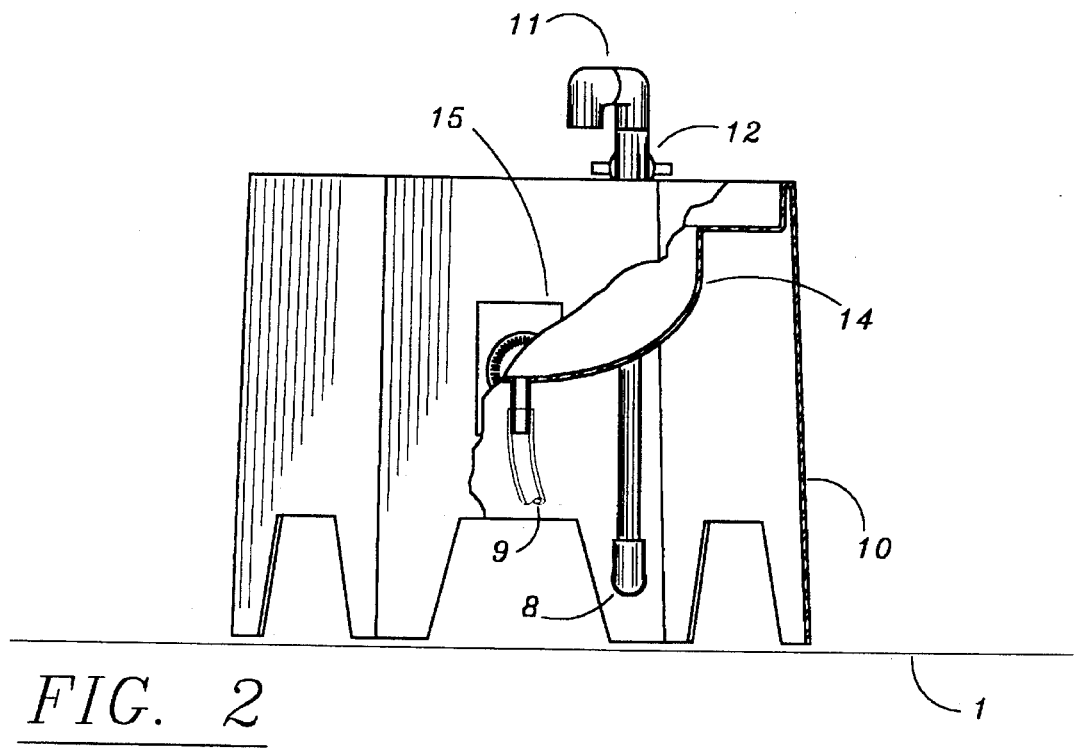
FIG. 2 is a tearaway elevation view of the pool chemical container shown in FIG. 1.

Referring to FIG. 2, chemicals are added to the container 10 into the bowl section 14. A stopper normally located in the bowl's opening port, is removed and the vacuum created by the venturi (FIG. 3) 7, draws the chemicals out of the container's bowl 14 and down the ⅜" tygon tube 9.

Back to FIG. 1, the chemicals reach the venturi 7 and are mixed with the water from the pump manifold 6 and out the manifold discharge tube 8. The timer 15 is set to operate for approximately 1 hour to thoroughly mix the chemicals into the water.

All of the testing of the water 3 and chemical additions to the pool is performed with the cover 2 in place and the pool's main pump system 17 out of operation.

At the end of the season, the system is simply removed and the pool is returned to it's normal state and existing pump system.

I claim:

1. A pool winterization process for a pool having water, main pool pump intake lines, a submersible pump and a manifold and injection venturi, the process comprising:

lowering the water in the pool to a level below the intake lines;

sampling a portion of the pool water on a periodic basis and analyzing the amount of chemicals in the pool water;

adding additional chemicals to a chemical container as needed based upon the analysis of the sampled pool water;

injecting the additional chemicals into the pool water from the container using the venturi; and mixing and agitating the water using the submersible pump.

2. The pool winterization process of claim 1 wherein the submersible pump is connected to a 60 minute timer for limited operation.

* * * * *